United States Patent
Itagaki

(10) Patent No.: US 7,511,825 B2
(45) Date of Patent: Mar. 31, 2009

(54) POINTING DEVICE

(75) Inventor: Nobutaka Itagaki, Tokyo (JP)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 75 days.

(21) Appl. No.: 11/765,626

(22) Filed: Jun. 20, 2007

(65) Prior Publication Data

US 2007/0291272 A1    Dec. 20, 2007

(30) Foreign Application Priority Data

Jun. 20, 2006   (JP)   .............................. 2006-169578

(51) Int. Cl.
 *G01B 9/02*   (2006.01)
(52) U.S. Cl. ..................... 356/498; 250/221; 345/166
(58) Field of Classification Search ................. 356/498, 356/508, 512; 250/221, 227.14; 345/166
See application file for complete search history.

(56) References Cited

U.S. PATENT DOCUMENTS

| | | | |
|---|---|---|---|
| 4,409,479 A | 10/1983 | Sprague et al. | |
| 4,972,091 A * | 11/1990 | Cielo et al. | 250/559.42 |
| 5,015,070 A | 5/1991 | Montgomery et al. | |
| 7,399,954 B2 * | 7/2008 | Venkatesh | 250/221 |
| 2002/0080121 A1 | 6/2002 | Son | |
| 2007/0008286 A1 * | 1/2007 | Theytaz et al. | 345/166 |

FOREIGN PATENT DOCUMENTS

| | | |
|---|---|---|
| JP | 2004-246921 | 9/2004 |
| JP | 2005-50349 | 2/2005 |
| JP | 3771081 | 2/2006 |

* cited by examiner

*Primary Examiner*—Hwa S Lee

(57) ABSTRACT

A pointing device includes a light source, an aperture member, and a detector. The light source provides incident light for illuminating an obverse surface of a plate at a predetermined incident angle. The plate has the obverse surface and a reverse surface and is transparent to the wavelength of the incident light. The aperture member has an opening through which speckle light from the obverse surface and speckle light from the reverse surface pass. The speckle light results from the incident light. The detector detects the intensity of the speckle light passing through the opening. In order that the speckle light from the obverse surface and the speckle light from the reverse surface overlap each other at the detector, the opening has a longitudinal dimension in a direction in which the incident angle is formed.

7 Claims, 4 Drawing Sheets

(A)

(B)

(C)

(A)

(B)

(C)

POINTING DEVICE

FIELD OF THE INVENTION

The present invention generally relates to devices for optically detecting motion. In particular, the present invention relates to an optical pointing device or an optical navigation device for use as a peripheral for a personal computer or the like.

BACKGROUND OF THE INVENTION

Currently, non-mechanical (i.e., optical) mice and pointing devices are commercially available. One example is disclosed in Japanese Patent No. 3771081. In this technology, an operation surface is illuminated with light at a low incident angle, specifically, 70° to 85°, and the microscopic textures of the surface are detected based on their highlights and shades. In general, an LED (light emitting diode) is often used for the light; a laser diode, particularly, a VCSEL (vertical cavity surface emitting laser), may also be used to improve the ability to recognize the microscopic textures.

Japanese Unexamined Patent Application Publication No. 2005-50349 discloses a pointing device that includes an optical motion-detecting circuit. This optical motion-detecting circuit determines the amount of movement by illuminating a surface with infrared light and determining a correlation between images based on light reflected from the surface. This motion detecting circuit (included in the pointing device) detects motion in a predetermined direction by correlating a reference frame, which is a digitized output of reflection light obtained by a light detector, and a sample frame, which is the next digitized output obtained after the reference frame.

In addition, for example, a motion detecting device disclosed in Japanese Unexamined Patent Application Publication No. 2004-246921 has been incorporated into a commercially available pointing device. This device includes a navigation sensor and a light source, such as a laser diode, for producing coherent light. The sensor detects reflection light resulting from light emitted from the light source to determine the amount of movement of a pointing device (e.g., a mouse).

The pointing device disclosed in Japanese Unexamined Patent Application Publication Nos. 2005-50349 and 2004-246921, however, may not operate accurately or may malfunction when used on a glass surface. This is because a glass surface is generally very smooth and the pointing device disclosed in these publications cannot detect microscopic textures, which are necessary for the pointing device to successfully perform detection. In addition, the surface roughness of the glass surface is about several nanometers, which is very small compared to the wavelength of incident light and is even very small compared to one pixel of the light detector, which also makes it difficult to detect the microscopic textures.

The signal intensity of the aforementioned reflection light will be briefly described next. In general, in order to detect the intensity of light reflected from a plate surface having a certain surface roughness as a light/dark pattern, it is required that the size of the light/dark pattern be larger than the light wavelength and be substantially the same as the size of one pixel used for detection.

Additionally, since the surface roughness of glass is about several nanometers, which is very small, it is difficult to perform high-sensitivity detection of the amount of change in the intensity of reflection light from such a surface.

With a mirror, the intensity of reflection light is equal to the intensity of incident light. With glass or the like, however, the intensity of reflection light varies depending on the reflection coefficient of its surface (the reflection coefficient depends on the polarization direction and incident angle of light). The average intensity $I_R$ of the reflection light is given by:

$$I_R = R \cdot I_{IN} \quad \text{(Expression 1)}$$

where R indicates the reflection coefficient and $I_{IN}$ indicates the intensity of the incident light.

In general, the average intensity $I_d$ of speckle light emitted from the surface is given by:

$$I_d \approx (4\pi\sigma/\lambda)^2 \cdot I_R \quad \text{(Expression 2)}$$

There are demands for a pointing device, such as an optical mouse, that can be used on a smooth plate, such as a glass plate.

SUMMARY OF THE INVENTION

Accordingly, an object of the present invention is to provide a pointing device that operates accurately, even on a plate having an extremely small surface roughness, by using an aperture member for causing light reflected from the obverse surface of a plate and light reflected from the reverse surface to overlap each other at a detector.

Specifically, the present invention provides a pointing device that comprises a light source, an aperture member, and a detector. The light source provides incident light for illuminating an obverse surface of a plate at a predetermined incident angle. The plate has an obverse surface and a reverse surface and is transparent to a wavelength of the incident light. The aperture member has an opening through which speckle light from the obverse surface and speckle light from the reverse surface pass, the speckle light resulting from the incident light. The detector detects an intensity of the speckle light passing through the opening. In order that the speckle light from the obverse surface and the speckle light from the reverse surface overlap each other at the detector, the opening has a longitudinal dimension in a direction in which the incident angle is formed.

Such a navigation system using speckle light is small in signal level, as compared to a system using reflection light, but has an advantage in that detection is possible even when used on a surface having an extremely small surface roughness.

The term "speckle light" herein refers to light resulting from a unique pattern formed of projections and depressions on the obverse surface or reverse surface of an object when it is illuminated with light.

The opening of the pointing device may have a rectangular shape or a slit shape. The pointing device may further comprise a lens for converging or diverging the incident light from the light source. In an embodiment, the light source comprises a laser light source. In an embodiment, the laser light source comprises a VCSEL.

In an embodiment, the pointing device further comprises an optical filter or a lens between the aperture member and the plate. The optical filter can block external light or the lens allows more speckle light from the plate to be obtained. Such an arrangement improves the S/N (signal-to-noise) ratio and enhances the detection sensitivity.

According to the present invention, since not only the light reflected from the obverse surface of the plate but also the light reflected from the reverse surface is utilized, it is possible to increase the signal intensity. Consequently, even on a plate having an extremely small surface roughness, the pointing device can operate accurately, thus improving the tracking performance.

The pointing device of the present invention can be used not only on a transparent plate but also on an opaque plate, such as a white plate, on which a typical optical mouse can operate. In this case, speckle light from the upper surface of the opaque plate is mainly detected.

Other aspects and advantages of the present invention will become apparent from the following detailed description, taken in conjunction with the accompanying drawings, illustrated by way of example of the principles of the invention.

DETAILED DESCRIPTION

Figure 1:
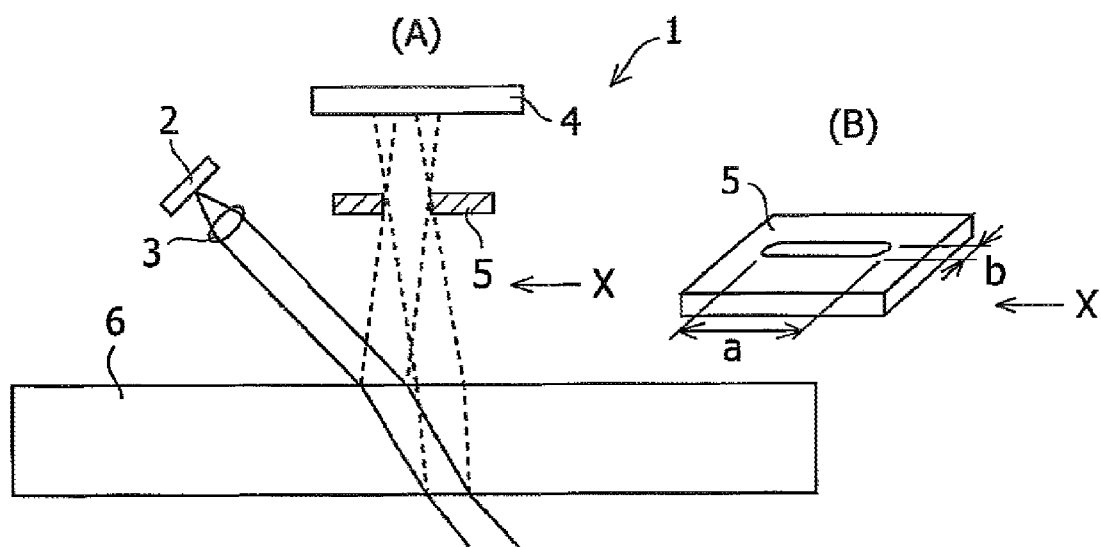
FIG. 1A is a sectional diagram showing the internal structure of a pointing device used for implementing the present invention.
FIG. 1B is a perspective view showing the shape of an opening of an aperture member.

FIG. 1A shows a pointing device 1 used for implementing the present invention. This pointing device 1 may include a light source 2, a lens 3, a light detector (or light sensor) 4, and an aperture member 5 having an opening. Light emitted from the light source 2 is converged or diverged by the lens 3. The resulting light is incident on a plate 6 at a predetermined incident angle and speckle light resulting from light reflected from the plate 6 passes through the opening of the aperture member 5. The intensity of the speckle light is detected by the light detector 4. The term "speckle light" herein refers to light resulting from a unique pattern formed of projections and depressions on the obverse surface or reverse surface of an object when it is illuminated with light.

The light source 2 may be, for example, a vertical cavity surface emitting laser (VCSEL). The light source 2, however, is not limited to such a laser light source and may be any type of coherent light source. An illumination beam emitted from the light source 2 does not necessary have to be collimated light, such as laser light (although collimated light offers an advantage in that the tracking characteristics in X- and Y-axis directions become equal to each other). The tracking characteristics in the X- and Y-axis directions can also be made equal to each other, even without the use of such collimated light. For example, an aperture member (not shown) having a cross-shaped opening that extends along its X axis and Y axis may be used, and laser diodes and light detectors (not shown) may be provided for the corresponding extended portions of the cross-shaped opening, and the two laser diodes are alternately turned on. With such an arrangement, simultaneously turning on the two laser diodes to increase the power of the input beam can also enhance the speckle signal level.

The light source 2 may have a wavelength in the range of about 500 nm to about 1 μm. In practice, an appropriate wavelength is selected based on the sensitivity characteristic of the light detector 4 relative to the wavelength. A longer wavelength causes the speckle size to increase, which is advantageous for measurement but causes the speckle intensity to decrease, as indicated by Expression 2 noted above. It is, therefore, preferable to select an appropriate wavelength based on the speckle size as well.

In general, the speckle size is proportional to the inverse of the spot size (i.e., the focal-point size) on the illuminated surface or the inverse of the area of speckle light after the light passes through the opening of the aperture member. Thus, adjustment of the lens 3 so that the spot (i.e., the focal point) comes on the illuminated surface can maximize the spot size. It is not so much a problem when the speckle size is larger than the pixel size of the light detector 4, but when the speckle size is smaller than the pixel size, the S/N ratio may deteriorate. In addition, although the adjustment of the lens 3 so that the spot (i.e., the focal point) comes on the illuminated surface can maximize the speckle size, a problem may arise in that the navigation function does not work.

In practice, therefore, with light that is spatially displaced from collimated light to some extent, rather than with collimated light, an improvement in the function of the entire system (including the pointing device) can be expected. In this case, with light that is spatially displaced from collimated light, the spot size on the operation surface increases and the speckle size decreases. In order to reduce the influence of the decreased speckle size, it is preferable to optimize the size of the opening of the aperture member 5.

The use of the aperture member 5 together with an optical filter can eliminate or reduce the influence of external light (such as ambient light) that is incident from below the glass surface.

The illumination beam emitted from the light source 2 may be optionally and selectively adjusted with the lens 3 so that the spot of the illumination beam, when it reaches the plate 6, has a desired size (in the range of about 0.1 to about 3 mm).

The light detector 4 may be implemented with a device having a plurality of light-receiving elements (pixels) arranged in a matrix. Examples of the device include a CMOS (complementary metal-oxide semiconductor) imager and a CCD (charge-coupled device). Alternatively, the light detector 4 may be implemented with a striped sensor having its longitudinal dimension along the X axis and a striped sensor having its longitudinal dimension along the Y axis.

FIG. 1B is a perspective view showing the shape of the opening of the aperture member 5 for use in the pointing device 1 shown in FIG. 1A. In FIGS. 1A and 1B, for clarity, reference letter "X" indicates the direction in which the opening of the aperture member 5 extends and the dimension of the opening in the direction in which the opening extends is referred to as "longitudinal dimension" herein. As shown in FIGS. 1A and 1B, the aperture member 5 is disposed between the plate 6 and the light detector 4 so that the opening of the aperture member 5 extends along the direction in which light emitted from the light source 2 and incident at a predetermined incident angle travels. The arrangement of the aperture member 5 in this manner allows the same light-receiving elements (pixels) of the light detector 4 to receive both speckle light from the obverse surface (i.e., the upper surface) of the plate 6 and speckle light from the reverse surface (i.e., the lower surface) of the plate 6. As a result, large speckle signals can be obtained even when the surface roughness of the plate 6 is extremely small.

Figure 2:
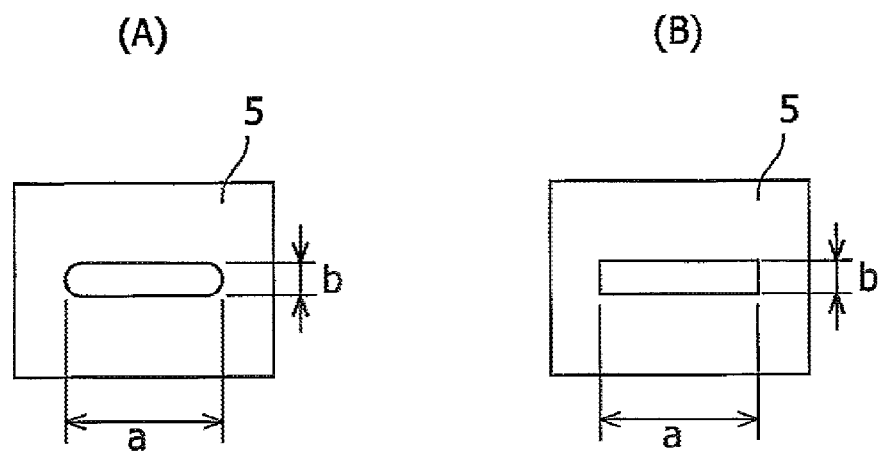
FIGS. 2A and 2B are schematic diagrams each showing the shape of the opening of the aperture member used for implementing the present invention.

FIGS. 2A and 2B show examples of the opening of the aperture member 5. The opening of the aperture member 5 may have a slit shape, for example, a shape whose sides in the lateral direction are not straight but are rounded with a longitudinal dimension a and a lateral dimension b, as shown in FIG. 2A. Alternatively, the opening of the aperture member 5 may have a rectangular shape with a longitudinal dimension a and a lateral dimension b, as shown in FIG. 2B.

The use of the aperture member 5 shown in FIG. 2A or 2B allows the speckle light from the obverse surface of the plate 6 and the speckle light from the reverse surface thereof to overlap each other at the light-receiving elements (pixels) of the light detector 4. Thus, it is possible to obtain speckle light with a higher intensity.

Light that reaches the light detector 4 through the opening of the aperture member 5 has, at the light-receiving elements of the light detector 4, a shape that reflects the shape of the opening of the aperture member 5 (this point is described below and shown in FIGS. 4A to 4C). Thus, in order to efficiently use the (rectangular) pixels included in the light detector 4, it is preferable that the opening of the aperture member 5 have a rectangular shape as shown in FIG. 2B.

It is also preferable that the lateral dimension b of the opening of the aperture member 5 be substantially the same as the width of the light-receiving surface of the light detector 4. An increase in the lateral dimension b of the opening can improve the S/N ratio, which represents the signal intensity, because the amount of light received by the light detector 4 increases, but the speckle size decreases. Thus, when each light-receiving element included in the light detector 4 is large, the S/N ratio may deteriorate since changes in speckle light are averaged by the individual pixels.

Figure 3:
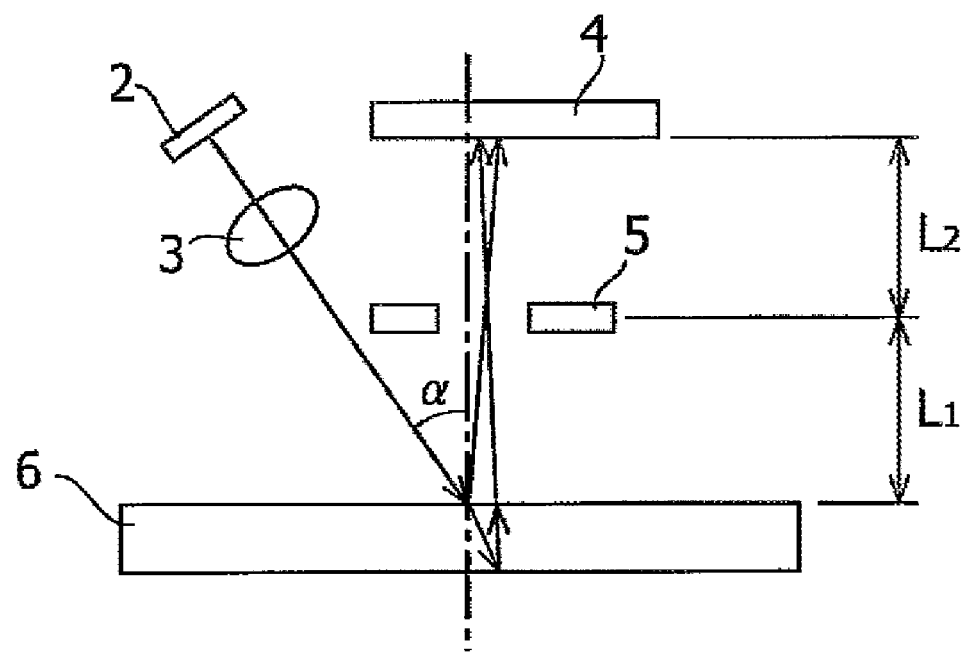
FIG. 3 is a sectional diagram showing the internal structure of the pointing device shown in FIG. 1, the position of the aperture member, and the path of light reflected from the obverse surface and the reverse surface of a plate.

For example, in FIG. 3, it is preferable that the distance L1 be in the range of 3 to 20 mm, the distance L2 be in the range of 2 to 10 mm, the incident angle α be in the range of 30° to 70°, the lateral dimension of the opening of the aperture member 5 be about 1 mm, and the longitudinal dimension of the opening be in the range of 2 to 4 mm.

For example, an optical filter (not shown) for blocking external light or a lens (not shown) for obtaining more speckle light from the plate 6 may further be interposed between the aperture member 5 and the plate 6. The optical filter is necessary for operation where ambient light is present.

The pointing device 1 of the present invention can detect, at the same receiving elements (pixels) of the light detector 4, not only signal components of speckle light from the obverse surface of the plate 6 but also signal components of speckle light from the reverse surface of the plate 6. Thus, it is possible to increase the signal intensity detected by the light detector 4 by a factor of about 2. For many glass desks, only the obverse side (i.e., the upper-surface side) of the glass is polished. Consequently, in many cases, the surface roughness of the reverse surface of the glass is greater than that of the obverse surface, so that signals obtained from speckle light from the reverse surface are generally stronger than those obtained from the obverse surface. In addition, when there is a fingerprint, dust, or the like on the obverse surface, the intensity of the speckle light increases.

Now, a description is briefly given of a method for determining the signal intensity at the light-receiving elements (pixels) where the speckle light from the obverse surface and the speckle light from the reverse surface overlap each other at the light detector 4. Due to the speckle light, the light detector 4 obtains a digitized pixel output called a "reference frame". Subsequent to the reference frame, the light detector 4 obtains a digitized pixel output called a "sample frame". These pixel outputs are stored in a memory (not shown). The pixel outputs are used to calculate a light/dark pattern between pixels and the amount of light. When the calculated values are predetermined values or less, it is determined that the pointing device is located out of range, that is, beyond a predetermined distance from the plate 6. Otherwise, it is determined that the pointing device 6 is within a predetermined distance from the plate 6 and thus is in the tracking mode. In this case, the correlation between the reference frame and the sample frame is calculated and the amount of displacement Δx and Δy between the reference frame and the sample frame is estimated and output.

A determination is then made as to whether to change the reference frame, and if needed, a new reference frame is obtained. Thereafter, the above described process, i.e., obtaining a sample frame, is performed again, and then the same operation and measurement described above are repeated.

A description is now given of examples in which the pointing device 1 was used on a glass plate 6. It should be noted that the material of the plate 6 is not limited to glass and may be any material that is transparent to the wavelength of light emitted from the light source 2.

EXPERIMENTAL EXAMPLE

An example of the pointing device 1 according to the present invention will be described with reference to FIG. 3. The light source 2 of the pointing device 1 was implemented with a VCSEL having a wavelength of 665 nm. The illumination beam emitted from the light source 2 was made incident on the glass plate 6 via the lens 3 at an incident angle α (about 50°). A glass plate having a thickness of 10 mm was used as the plate 6. A CCD having a matrix of 1024×768 pixels, each having a dimension of 4.6 μm on each side, was used as the light detector 4 for receiving speckle light from the plate 6. The aperture member 5 described above and shown in FIG. 2A was used, and the longitudinal dimension a of the opening of the aperture member 5 was 2 mm and the lateral dimension b thereof was 1 mm.

The distance L1 between the obverse surface of the glass plate 6 and the aperture member 5 was 8 mm and the distance L2 between the aperture member 5 and the light-receiving surface of the light detector 4 was 4 mm. These distances are not limiting and thus may have other values.

In the example shown in FIG. 3, although the light detector 4 is positioned parallel to the operation surface (i.e., the plate surface), the present invention is not limited thereto. For example, the orientation of the light detector 4 may be adjusted according to the angle of light reflected from the operation surface. Although a configuration in which the light detector 4 and the aperture member 5 are disposed above the operation surface and in a direction substantially perpendicular thereto is illustrated in FIG. 3, the present invention is not limited thereto. For example, the light detector 4 and the aperture member 5 may be disposed at a predetermined angle other than at the angle perpendicular to the operation surface.

The average speckle size is given by f(f-number)×λ (wavelength) and is about 8 μm in the device configuration shown in FIG. 3. The light detector 4 is operable even if the pixel size of the light detector 4 is larger than the speckle size; however, the detection sensitivity (i.e., S/N ratio) of the light detector 4 may somewhat deteriorate.

Figure 4:
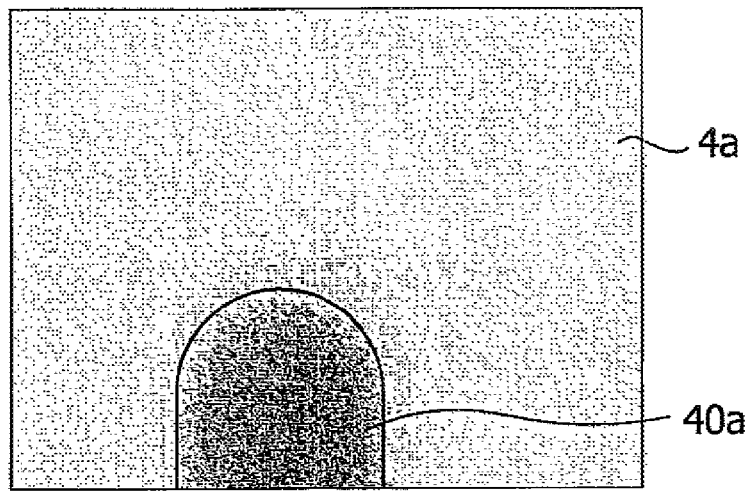
FIG. 4A shows an image obtained when speckle light from the obverse surface of the plate is captured by the CCD described in the first example.
FIG. 4B shows an image obtained when speckle light from the reverse surface of the plate is captured by the CCD described in the first example.
FIG. 4C shows an image obtained when both speckle light from the obverse surface and the reverse surface of the plate are captured by the CCD described in the first example.
Figure 4:
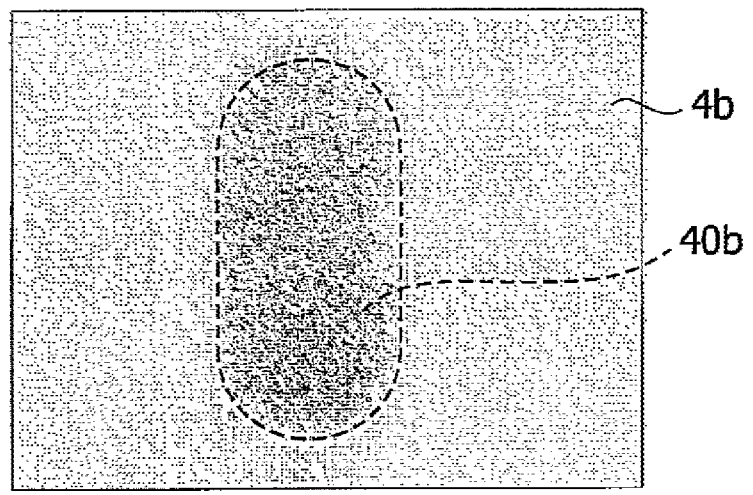
Figure 4:
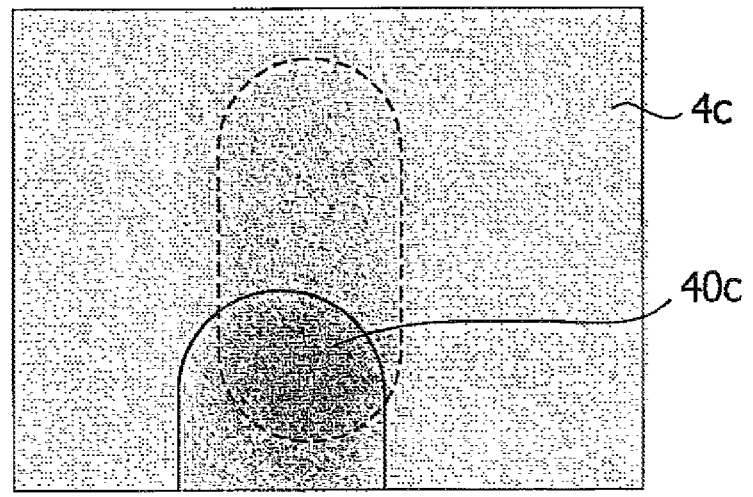

FIGS. 4A to 4C show images of signal intensities of speckle light obtained by the light detector 4 when the conditions shown in FIG. 3 were satisfied. For clarity of the images, it should be noted that they are illustrated with the positive and negative (white and black) regions of actual images being inverted (i.e., black portions in the images have higher light intensities).

In FIG. 4A, an image 4a was obtained when light reflected from the obverse surface of the plate 6 was detected by the light detector 4, the area 40a surrounded by the solid line indicating speckle light from the obverse surface. In FIG. 4B, an image 4b was obtained when light reflected from the reverse surface of the plate 6 was detected by the light detector 4, the area 40b surrounded by the dotted line indicating speckle light from the reverse surface. In FIG. 4C, an image 4c was obtained when light reflected from the obverse surface and the reverse surface of the glass plate 6 were superimposed on each other, the area 40c surrounded by the solid line and dotted line indicating the portion where the speckle light from the obverse surface and the reverse surface overlap each other. As shown in FIG. 4C, the aperture member 5 caused the speckle light from the obverse surface and the reverse surface of the plate 6 to overlap each other at the light detector 4. Thus, the detection sensitivity (S/N ratio) of the light detector 4 was improved compared to a case in which the speckle light from only the obverse surface was detected. Consequently, even when used on a smooth and transparent plate 6 made of glass or the like, this arrangement made it possible to accurately detect the motion of the pointing device 1, based on the speckle light from the plate 6.

Figure 5:
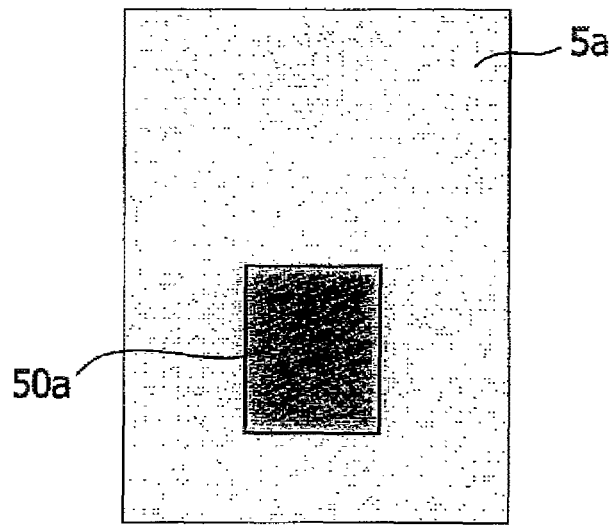
FIG. 5A shows an image obtained when speckle light from the obverse surface of the plate is captured, in the same manner as in FIG. 4A, by the CCD through a square opening (corresponding to a conventional opening).
FIG. 5B is an image obtained when speckle light from the reverse surface of the plate is captured, in the same manner as in FIG. 4B, by the CCD through the square opening (corresponding to a conventional opening).
FIG. 5C is an image obtained when both speckle light from the obverse surface and the reverse surface of the plate are captured, in the same manner as in FIG. 4C, by the CCD through the square opening (corresponding to a conventional opening).
Figure 5:
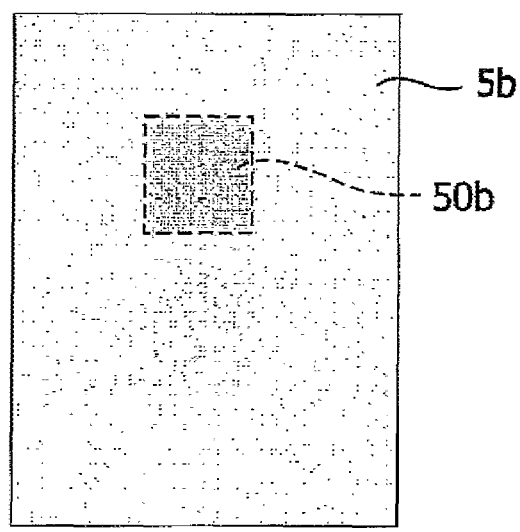
Figure 5:
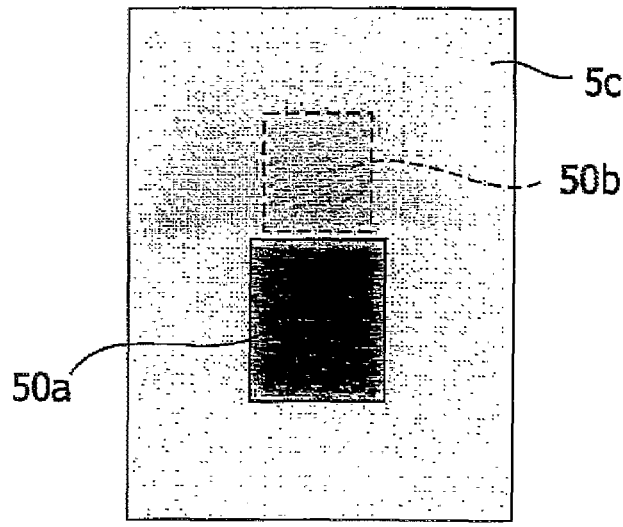

In contrast, FIGS. 5A to 5C show results when a square opening (1 mm on each side), which corresponds to a conventional opening, was used to perform measurement on the same surface portion of the same plate 6. In FIG. 5A, an image 5a was obtained when light reflected from the obverse surface of the plate 6 was detected by the light detector 4, the area 50a surrounded by the solid line indicating speckle light from the obverse surface. In FIG. 5B, an image 5b was obtained when light reflected from the reverse surface of the plate 6 is detected by the light detector 4, the area 50b surrounded by the dotted line indicating speckle light from the reverse surface. An image 5c shown in FIG. 5C was obtained when light reflected from the obverse surface and the reverse surface of the glass plate 6 were superimposed on each other. It is clear from FIG. 5C that, with the opening corresponding to a conventional one, the speckle light 50a from the obverse surface of the plate 6 and the speckle light 50b from the reverse surface do not overlap each other.

Whether or not the speckle light from the obverse surface and the reverse surface overlap each other depends on the thickness of the plate 6. However, when considering that the thicknesses of glass plates used for tables and so on are typically 10 to 15 mm, speckle light from the obverse surface and the reverse surface do not overlap each other through the square opening (corresponding to a conventional opening). Thus, the aperture member 5 according to the present invention offers a great advantage.

The description given in the above example is of a case using the aperture member 5 having one opening with a longitudinal dimension and a lateral dimension. The aperture member 5, however, is not limited to the arrangement described above and may be, for example, an aperture member having a plurality of circular or square openings arranged in the same direction in which the above-described opening of the aperture member 5 extends.

When the thicknesses (in the range of 10 to 15 mm) of typical glass plates are taken into account, a pinhole aperture that is typically provided between the glass plate and the optical detector in order to improve the S/N ratio cannot cause light reflected from the obverse surface and light reflected from the reverse surface to be received at the same light-receiving elements of the light detector (i.e., cannot make light reflected from the obverse surface and light reflected from the reverse surface overlap each other at the light-receiving element). Optical mice having an opening that extends in one direction (e.g., an opening having an oval shape) are also commercially available. However, the opening of those optical mice is formed to introduce a large amount of reflection light (which enters the opening at an oblique angle) from the plate surface to the light-receiving elements, but is not designed to cause speckle light (scattered light) from the obverse surface and the reverse surface of the plate to overlap each other at the light-receiving elements.

In order to measure speckle light from the obverse surface and the reverse surface of the plate, an aperture member having a large opening may be used or the aperture member itself may be eliminated. In such a case, however, although speckle light from both surfaces can be measured, the contrast of speckle light decreases due to background light (such as ambient light). The same can be true for a case using an optical filter (an optical bandpass filter). Thus, in terms of improving the contrast of speckle light, some kind of aperture member is required. In the example described above, the use of both the optical filter and the aperture member made it possible to prevent a contrast decrease caused by background light (such as ambient light).

While the pointing device 1 used for implementing the present invention has been described above, it should be understood that those specific device configurations are merely illustrative. It will be apparent to those skilled in the art that various device configurations, other than those described above, can also be employed in order to implement the present invention disclosed in the claims.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A pointing device comprising:
   a light source for providing incident light for illuminating an obverse surface of a plate at a predetermined incident angle, the plate having the obverse surface and a reverse surface and being transparent to a wavelength of the incident light;
   an aperture member having an opening through which speckle light from the obverse surface and speckle light from the reverse surface pass, the speckle light resulting from the incident light; and
   a detector for detecting an intensity of the speckle light passing through the opening;
   wherein in order that the speckle light from the obverse surface and the speckle light from the reverse surface overlap each other at the detector, the opening has a longitudinal dimension in a direction in which the incident angle is formed.

2. The pointing device according to claim 1, wherein the opening of the plate has a rectangular shape or a slit shape.

3. The pointing device according to claim 1, further comprising a lens for converging or diverging the incident light from the light source.

4. The pointing device according to claim 1, wherein the light source comprises a laser light source.

5. The pointing device according to claim 4, wherein the laser light source comprises a vertical cavity surface emitting laser.

6. The pointing device according to claim 1, further comprising an optical filter or a lens between the aperture member and the plate.

7. The pointing device according to claim 1, wherein the device also can detect light from the surface of an opaque plate which is opaque against a wavelength of the incident light.

* * * * *